United States Patent [19]

Beierlorzer

[11] Patent Number: 5,755,656
[45] Date of Patent: May 26, 1998

[54] CUSHIONING CONVERSION MACHINE AND METHOD WITH INDEPENDENT EDGE CONNECTING

[75] Inventor: Edwin P. Beierlorzer, Bellevue, Wash.

[73] Assignee: Ranpak Corp., Concord Township, Ohio

[21] Appl. No.: 487,012

[22] Filed: Jun. 7, 1995

[51] Int. Cl.$^6$ ........................................ B31F 1/10
[52] U.S. Cl. ........................... 493/464; 493/967; 493/1
[58] Field of Search ...................... 493/287–289, 493/295, 297, 302, 464, 407, 967, 257, 185, 344, 346, 349, 379, 381, 383, 385, 395

[56] References Cited

U.S. PATENT DOCUMENTS

| | | |
|---|---|---|
| 1,723,355 | 8/1929 | Kirschbraun . |
| 1,989,794 | 2/1935 | Duvall . |
| 2,273,162 | 2/1942 | Willard . |
| 2,663,072 | 12/1953 | Pfisterhammer . |
| 2,721,709 | 10/1955 | Averbacher . |
| 2,882,802 | 4/1959 | Walker . |
| 2,935,002 | 5/1960 | Robinson, Jr. . |
| 3,238,852 | 3/1966 | Schur et al. . |
| 3,323,983 | 6/1967 | Palmer et al. . |
| 3,325,120 | 6/1967 | Brinkman . |
| 3,377,224 | 4/1968 | Greshaw et al. . |
| 3,509,797 | 5/1970 | Johnson ............ 493/464 |
| 3,509,798 | 5/1970 | Johnson ............ 493/464 |
| 3,603,216 | 9/1971 | Johnson ............ 493/967 |
| 3,613,522 | 10/1971 | Jonhson ............ 493/967 |
| 3,655,500 | 4/1972 | Johnson ............ 493/464 |
| 3,789,757 | 2/1974 | Motter et al. . |
| 3,899,166 | 8/1975 | Behn ............... 270/83 |
| 4,026,198 | 5/1977 | Ottaviano .......... 493/967 |
| 4,085,662 | 4/1978 | Ottaviano .......... 493/967 |
| 4,109,040 | 8/1978 | Ottaviano .......... 428/129 |
| 4,237,776 | 12/1980 | Ottaviano .......... 493/967 |
| 4,355,437 | 10/1982 | Wright ............. 17/42 |
| 4,557,716 | 12/1985 | Ottaviano .......... 493/967 |
| 4,717,613 | 1/1988 | Ottaviano .......... 493/464 |
| 4,750,896 | 6/1988 | Komaransky et al. . 493/646 |
| 4,839,210 | 6/1989 | Komaransky et al. . 493/464 |
| 4,884,999 | 12/1989 | Baldacci .......... 493/646 |
| 4,937,131 | 6/1990 | Baldacci et al. ... 428/131 |
| 4,968,291 | 11/1990 | Baldacci et al. ... 493/354 |
| 4,994,010 | 2/1991 | Doderer-Winkler .. 493/385 |
| 5,061,543 | 10/1991 | Baldacci . |
| 5,088,971 | 2/1992 | Parker ............. 493/352 |
| 5,123,889 | 6/1992 | Armington et al. .. 493/352 |
| 5,173,352 | 12/1992 | Parker ............. 493/967 |
| 5,188,581 | 2/1993 | Baldicci . |
| 5,211,620 | 5/1993 | Ratsel et al. ...... 493/346 |
| 5,468,208 | 11/1995 | Armington et al. .. 493/346 |
| 5,471,783 | 12/1995 | McLean . |
| 5,487,717 | 1/1996 | Tekavec ........... 493/464 |

*Primary Examiner*—Joseph J. Hail, III
*Assistant Examiner*—Christopher W. Day
*Attorney, Agent, or Firm*—Renner, Otto, Boisselle & Sklar, P.L.L.

[57] ABSTRACT

A cushioning conversion machine and method for converting multiple layers of sheet-like stock material into a cushioning product are characterized by a forming assembly which shapes plural layers of the stock material into a continuous three dimensional strip of dunnage having central portions and overlapped edge portions, a connecting assembly downstream of the forming assembly for connecting the overlapped lateral edge portions of the layers separately from central portions of the layers, and a guide which directs the central portions of the layers away from connecting assembly to prevent the central portions from passing through the connecting assembly. The thereby produced dunnage product comprises layers of sheet-like material folded upon themselves with outer lateral edge portions thereof overlapped and stitched together separate from central portions of the layers, the overlapped lateral edge portions being generally coplanar with adjacent unoverlapped portions of the layers, and the layers of stock material comprising biodegradable, recyclable and reusable Kraft paper.

14 Claims, 6 Drawing Sheets

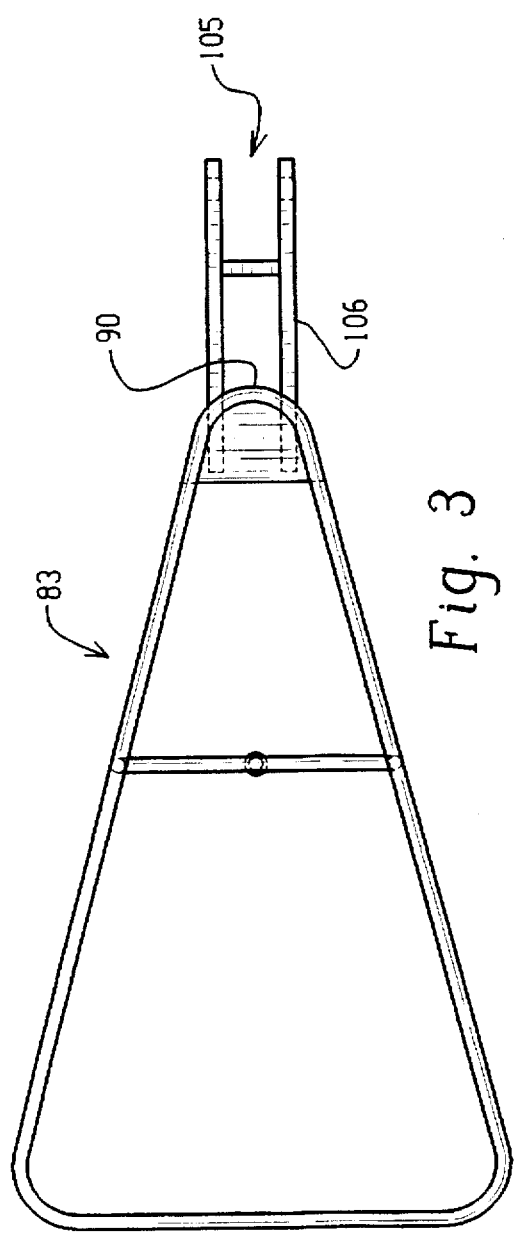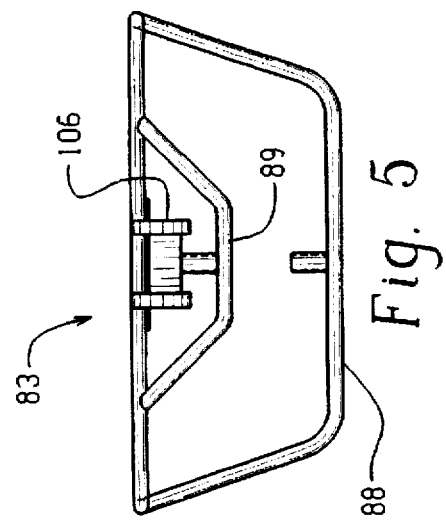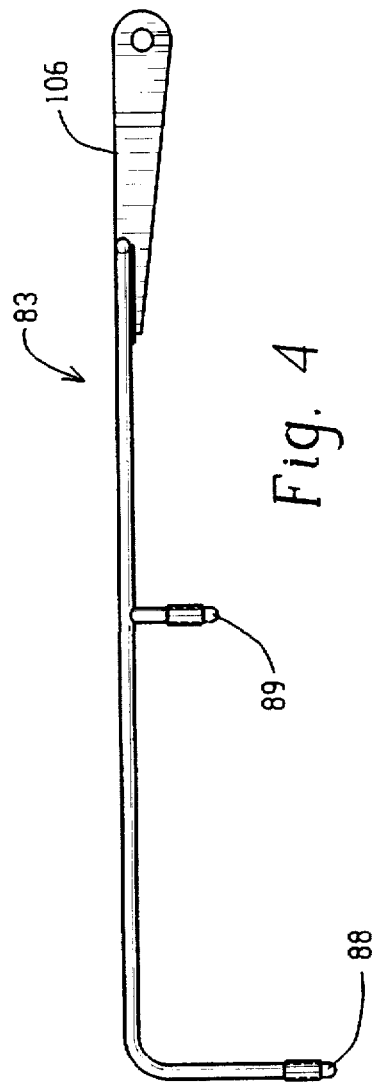

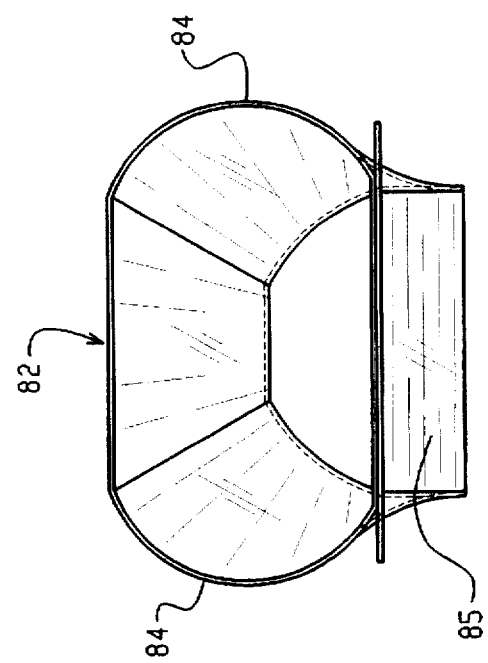
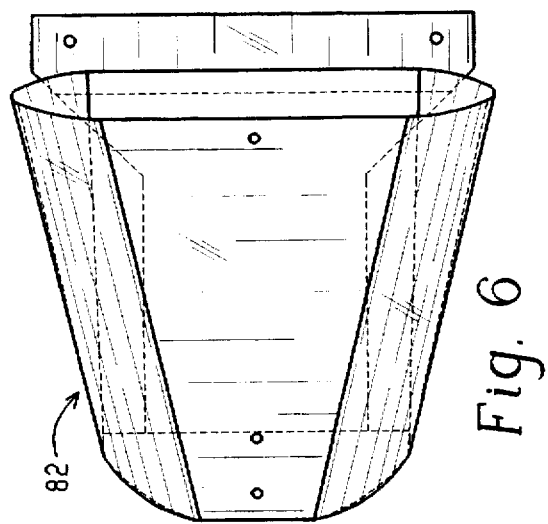
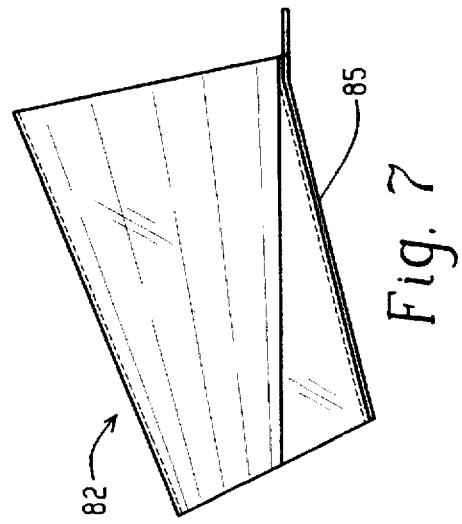

CUSHIONING CONVERSION MACHINE AND METHOD WITH INDEPENDENT EDGE CONNECTING

FIELD OF THE INVENTION

The herein described invention relates generally to a cushioning conversion machine and method for converting sheet-like stock material into a cushioning product, a novel form of stitching assembly for connecting a cushioning product formed from sheet-like stock material, and a resultant novel cushioning product.

BACKGROUND OF THE INVENTION

In the process of shipping an item from one location to another, a protective packaging material is typically placed in the shipping case, or box, to fill any voids and/or to cushion the item during the shipping process. Some conventional protective packaging materials are plastic foam peanuts and plastic bubble pack. While these conventional plastic materials seem to adequately perform as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

The foregoing and other disadvantages of conventional plastic packaging materials have made paper protective packaging material a very popular alterative. Paper is biodegradable, recyclable and renewable, making it an environmentally responsible choice for conscientious industries.

While paper in sheet form could possibly be used as a protective packaging material, it is usually preferable to convert the sheets of paper into a relatively low density pad-like cushioning dunnage product. This conversion may be accomplished by a cushioning conversion machine/ method, such as those disclosed in U.S. Pat. Nos. 3,509,798, 3,603,216, 3,655,500, 3,779,039, 4,026,198, 4,109,040, 4,717,613 and 4,750,896, and also in pending U.S. patent applications Nos. 07/533,755, 07/538,181, 07/592,572, 07/734,512, 07/786,573, 07/840,306 and 07/861,225.

With most, if not all, of the conversion machines/methods disclosed in the above-identified patents and applications, the cushioning product is created by converting multi-layer, and preferably three-layer, paper stock material into a desired geometry. The cushioning product includes pillow-like portions formed by the lateral edges of all of the layers of stock paper being rolled inwardly to form a pair of twin spirals. The central regions of this structure are then compressed and connected (such as by coining) to form a central compressed portion and two lateral pillow-like portions which essentially account for the cushioning qualities of the product.

The central compressed portion of such a cushioning product is believed to be necessary to ensure that the pillow-like portions optimally maintain their cushioning qualities. In other words, without a connection of this type, the resiliency of the pillow-like portions would encourage the twin spirals to "unwind." However, the central portion, due to its compressed state, increases the density of the overall cushioning product.

In the past, attempts have been made to decrease the density of the cushioning products by altering its construction. Specifically, U.S. Pat. No. 4,717,613 introduced a conversion process/machine which creates a lower density cushioning product. The decrease in density is accomplished by urging the stock material outwardly into the pillow-like portions whereby the central compressed section is comprised of a lesser amount of stock material.

Despite past improvements, a need remains for conversion machines/methods which create paper cushioning products of even lower densities. Moreover, irrespective of particular density properties, environmental and other concerns, provide a constant desire for new and effective paper cushioning products and for machines/methods for creating such products.

Also, the cushioning conversion machines disclosed in the above identified patents use a connecting assembly comprising a pair of loosely meshed gear-like members between which overlapping portions of the stock material layers pass. The loosely meshed gear-like members cooperate to stitch, as by coining, the overlapping portions thereby to connect the strip along the central portion of the product disposed between lateral pillow-like portions that primarily contribute to the cushioning properties of the product.

A secure stitching is desired to maintain the intactness of the pillow-like portions and thus the cushioning properties of the dunnage product. To this end, perforations heretofore have been provided in the connecting portion of the produced dunnage strip to aid the coined portions in preventing opening up or separation of the connected portions of the product, this commonly being referred to as "unzippering". The perforations were produced by projections extending radially outwardly from the teeth of at least one of the gear-like members. For further details, reference may be had to U.S. Pat. Nos. 4,937,131 and 4,968,291.

Although the connecting assemblies disclosed in the above-identified patents adequately perform their connecting and other functions, it would be desirable to have a stitching assembly that further facilitates and/or enhances the stitching of overlapped portions of sheet-like stock material forming a low density cushioning product, particularly when using heavier weight and/or stiffer stock material.

SUMMARY OF THE INVENTION

The present invention provides a cushioning conversion machine and method for converting multiple layer of sheet-like stock material into a cushioning product. The construction of the cushioning product is such that the product's overall density is relatively low while at the same time the integrity of the product's cushioning qualities are maintained. Moreover, the cushioning product of the present invention may be, and preferably is, made of paper which is biodegradable, recyclable and renewable. Accordingly, the present invention provides an environmentally responsible alternative to plastic packaging products.

The present invention also provides a novel stitching assembly for a cushioning conversion machine, a cushioning conversion machine including the novel connecting assembly, a method of forming a novel cushioning product that results from using the novel connecting assembly, and a new dunnage product. A preferred embodiment of the stitching assembly provides a unique interlock between overlapped portions of the sheet-like stock material to prevent "unzippering" of the low density cushioning product produced by the cushioning conversion machine.

In accordance with the invention, a cushioning conversion machine for converting sheet-like stock material into a dunnage product comprises a forming assembly which shapes plural layers of the stock material into a continuous three dimensional strip of dunnage having central portions and overlapped edge portions, a connecting assembly downstream of the forming assembly for connecting the overlapped lateral edge portions of the layers separately from central portions of the layers, and a guide which directs the central portions of the layers away from connecting assembly to prevent the central portions from passing through the connecting assembly.

In a preferred embodiment of the invention, the connecting assembly includes a pair of rotating connecting members forming therebetween a nip through which the overlapped lateral edge portions of the first layer pass. The machine a frame structure, and the forming assembly includes a chute and a former extending into the chute, with one rotating member being mounted to a downstream end of the former interiorly of the path of the stock material and the other, which is rotatably driven, being mounted to the frame structure independently of the former and externally of the path of the stock material. More particularly, the one rotating member is mounted to a downstream end of a bracket connected to the former in cantilever-like manner and projecting through and beyond a downstream end of the chute. Moreover, the guide includes a finger projecting forwardly from the former to a point at least partially overlapping the rotating connecting members relative to the movement path of the stock material through the machine.

According to another aspect of the invention, there is provided a cushioning product comprising layers of sheet-like material folded upon themselves with outer lateral edge portions thereof overlapped and stitched together separate from central portions of the layers. The overlapped lateral edge portions are generally coplanar with adjacent unoverlapped portions of the layers, and the layers of stock material comprise biodegradable, recyclable and reusable Kraft paper.

According to another aspect of the invention, there is provided a method for converting sheet-like stock material into a dunnage product, comprising the steps of forming plural layers of the stock material into a tubular shape with the lateral edge portions of the layers being brought into overlapping relationship, and connecting the overlapped lateral edge portions of the layers independently of central portions of the layers.

Further in accordance with the invention, a novel stitching assembly for a cushioning conversion machine comprises a pair of rotatable stitching gears. The stitching gears have axial segments provided with radial projections such as teeth, at least some of which mesh and others which move past one another during rotation of the gears to slit and punch tab portions out of the overlapped layers of stock material.

According to still another aspect of the invention, a dunnage product is formed from at least one layer of stock material having overlapped portions overlapped portions including a central row of outwardly directed dents alternating with a inwardly directed dents, and at least one row of tabs adjacent the central row which are defined by laterally spaced apart slits, the tabs being punched from the layer of stock material in a direction opposite the relatively adjacent dent of the central row.

Further in accordance with a preferred embodiment of the invention, a cushioning conversion machine for converting a sheet-like stock material into dunnage sections of a desired length comprises a frame having an upstream end and a downstream end; a forming assembly, mounted to the frame, which shapes the stock material into a continuous three dimensional strip of dunnage having overlapped portions of the stock material; a pulling/connecting assembly mounted to the frame downstream of the forming assembly including a pair of interacting rotating members, the first of the rotating members including a pulling axial section which pulls the stock material through the forming assembly and a connecting axial section which connects the overlapped portions of the stock material; a stock supply assembly, positioned upstream of the forming assembly, which supplies the stock material to the forming assembly; and a cutting assembly, positioned downstream of the pulling connecting assembly, which cuts the connected strip of dunnage into dunnage sections of a desired length.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

BRIEF DESCRIPTION OF THE DRAWINGS

FIG. 3 is a plan view of the modified former used in the machine of FIG. 1.

FIG. 4 is a side view of the modified former used in the machine of FIG. 1.

FIG. 5 is a front end view of the modified former used in the machine of FIG. 1.

FIG. 6 is a plan view of the modified chute used in the machine of FIG. 1.

FIG. 7 is a side view of the modified chute used in the machine of FIG. 1.

FIG. 8 is a front end view of the modified chute used in the machine of FIG. 1.

DETAILED DESCRIPTION

Figure 1:
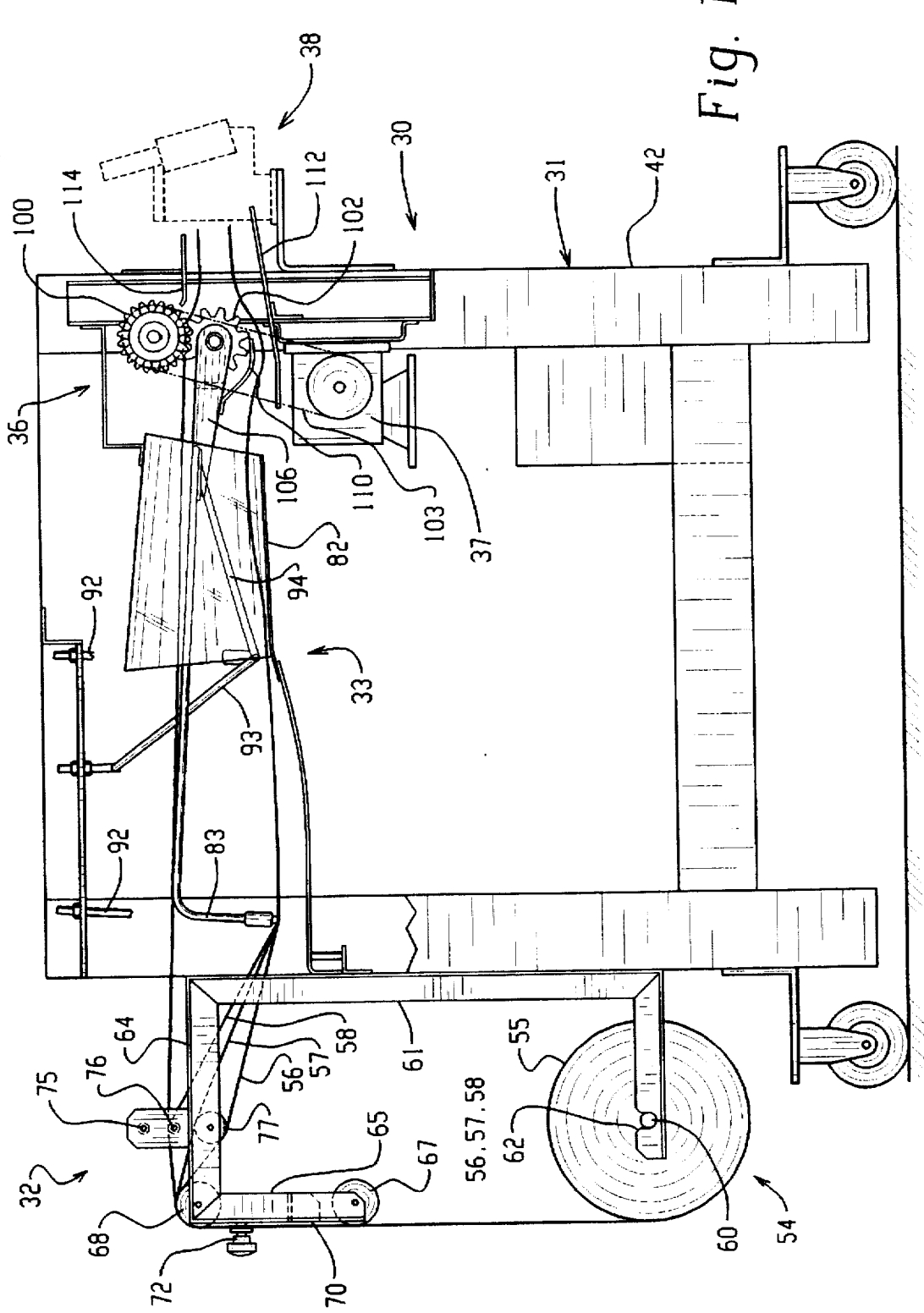
FIG. 1 is a side view of a cushioning conversion machine according to the invention with a side panel of the machine's housing nearest the viewer removed to permit viewing of internal machine components.
Figure 2:
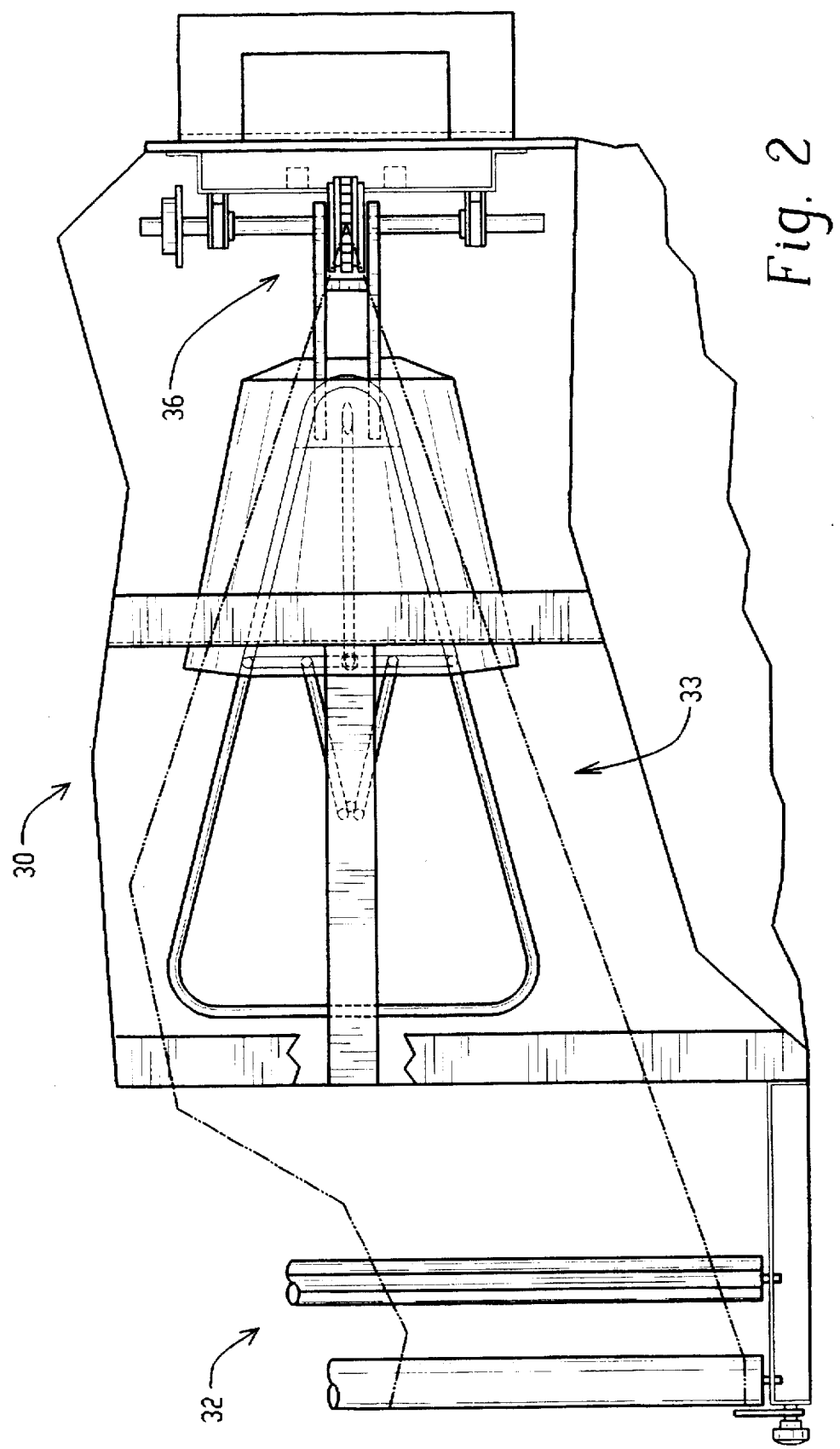
FIG. 2 is a partial plan view of the conversion machine with the top panel of the housing partly broken away to permit viewing of internal machine components.

Referring now to FIGS. 1 and 2, an exemplary embodiment of a cushioning conversion machine according to the invention is designated generally by reference numeral 30. The machine includes a housing 31 which forms the structural skeleton for the conversion assemblies of the machine 30. The conversion assemblies include a stock supply assembly 32, a forming assembly 33, a feed/connecting assembly 36 powered by a feed motor 37, and a cutting assembly 38. These assemblies of the machine 30 cooperate to convert sheet-like stock material into a cushioning product according to the present invention. The roles the conversion assemblies and components thereof play in the creation of such a cushioning product are explained below in detail. In regard to the various functions performed by the noted assemblies and components thereof, the terms (including a reference to a "means") used to identify the herein-described assemblies and devices are intended to correspond, unless otherwise indicated, to any assembly/device which performs the specified function of such an assembly/device, that is functionally equivalent even though not structurally equivalent to the disclosed structure which performs the function in the illustrated exemplary embodiment of the invention.

The illustrated machine 30, representing a preferred embodiment of the invention, is designed to convert multi-layer stock material into a cushioning product. Preferably, the stock material comprises at least two and preferably three or more superimposed layers which may be supplied in the form of a stock roll. These layers are each preferably 27–30 inches wide, and comprised of biodegradable, recyclable and reusable 30–50 pound Kraft paper.

The housing 31 includes a frame 42 to which the conversion assemblies of the machine are mounted. The frame includes upright legs and various cross frame members similar to the frame found in the well known PADPAK machines provided by Ranpak, Corp. of Concord, Ohio. However, it will be appreciated that the invention may be applied to other types of machines. The housing preferably has an outer sheet metal skin enclosing the interior conversion assemblies of the machine. The top wall of the housing may include an openable cover for permitting easy access to the components of the machine located inside the housing.

The illustrated stock supply assembly 32, located at the rear or upstream end (to the left in FIGS. 1 and 2) of the machine 30, includes a holder assembly 54 for a stock roll 55. The illustrated stock roll consists of three superimposed plies or layers 56–58 of biodegradable, recyclable and reusable thirty-pound Kraft paper rolled onto a hollow cylindrical tube. The stock roll may be supported by a spindle 60 or other stock roll holder device, such as that shown in U.S. patent application No. 08/267,960, between the lower arms of a pair of brackets 61 provided, as shown, with slots 62 for receiving the ends of the spindle. The stock roll holder assembly 54 need not be mounted to the machine housing as shown, but instead may be separate from the machine housing as in the form of a cart, especially when large and thus heavy stock rolls are used.

The brackets 61, which are secured to the rear of the housing 31, have upper arms 64 extending horizontally away from the housing and terminating at depending arms 65. The upper and depending arms have journalled therebetween guide rollers 67 and 68 over which the superimposed layers of stock material are trained. Between the guide rollers, the superimposed layers of stock material are passed over a splicing plate 70 extending transversely between the depending arms 65. The depending arms also have paper clamps 72 mounted thereto on opposite sides of the path of the stock material. The paper clamps are spring biased against an adjacent clamping surface and are rotatable from a position clear of the stock material path to a position overlaying the stock material path, such that when released the clamps are operative to hold the stock material to the clamping surface downstream of the splicing plate 70. It is noted that the terms "upstream" and "downstream" are herein used in relation to the direction of flow of the stock material through the machine 30. When the trailing ends of the layers of a spent stock roll are thus held, the leading ends of the layers of a next stock roll may be spliced to the trailing ends. The splicing plate provides a surface along which the layer ends may be cut to provide straight edges for splicing.

From the guide roller 68, the layers of stock material pass to separators 75–77 which separate the plies from one another. The separators preferably are rollers journalled between the upper arms 64 of the brackets 61. From the separators, the layers of the stock material pass to the entry end of the forming assembly 33. The forming assembly 33 includes a shaping chute 82 and a former 83 which cooperate to turn inwardly the edges of the layers to form a tubular strip of cushioning. The illustrated shaping chute (a converging chute as the cross section of the chute progressively decreases) and former generally are of the type shown in U.S. Pat. Nos. 4,717,613 and 4,750,896, and the description and illustration thereof are hereby incorporated herein by reference.

As best shown in FIGS. 6–8, the converging chute 82 has side walls 84 which turn towards one another to roll lateral edge portions of the inner layers toward one another. In addition to this rolling action, the inner layers will crumple because of the progressively decreasing cross-section of the converging chute. The chute is modified from previously used chutes by providing a more downwardly sloped bottom wall 85 to allow the central portions of the layers to exit the downstream end of the chute at a lower elevation spaced further from the overlapped lateral edge portions of the strip.

As best shown in FIGS. 3–5, the former 83 is in the form of a triangular frame having open U-shape guide surfaces 88 and 89 of progressively decreasing height and width going from the upstream to the downstream end of the former.

As shown in FIGS. 1 and 2, the former extends into the converging chute through the wider end thereof with the nose 90 of the former positioned at about the downstream end of the converging chute. The former is mounted in known manner to the frame by adjustable posts 92 and further is provided with various stiffening members 93 as needed to rigidly support the former and portions thereof.

The converging chute 82 and former 83 cooperate in well own manner to roll the layers of stock paper inwardly and bring the lateral edge portions thereof into overlapping relationship to form an unconnected strip of cushioning for passage to the feed/connecting assembly 36. In the illustrated embodiment of the invention, the feed/connecting assembly functions to connect together the overlapped lateral edge portions of the layers as well as to feed the stock material through the machine. The feed/connecting assembly includes a pair of gear-like members 100 and 102, often simply referred to a gears, forming therebetween a nip through which pass the overlapped lateral edge portions of the layers of stock material. The rotating connecting members may be toothed gear-like members of the type described in commonly assigned U.S. Pat. No. 4,968,291, which is hereby incorporated herein by reference, or any other pair of rotating devices that provide for secure stitching together of the outer layer edge portions, such as the hereinafter described preferred embodiment of stitching gears.

The upper gear 100 is rotatably mounted to the frame 42 and rotatably driven by the feed motor 37 through a chain drive mechanism 103. The lower gear 102 is mounted in a clevis 105 formed at the downstream end of a mounting bracket 106 attached to the nose end of the former 83 as best shown in FIGS. 3–5. The mounting bracket is sufficiently narrow such that the side portions of the layers may be folded therearound into a tubular shape and the laterally outer edge portions brought into an interleaved overlapping relationship prior to passage of such overlapped edge portions between the gears. As the overlapped edge portions are pulled between the gears, they are stitched together by the gears and thereby connected to resist opening or unzippering of the strip which may be detrimental to its cushioning and/or handling properties.

Unlike the conversion machines shown in the aforesaid U.S. Patents wherein both the edge portions and center portions of the layers are all passed between the gears, in accordance with the present invention only the overlapping edge portions of the layers are passed between the rotating gears while the center portions of the layers are guided along a path outside of the rotating gears. To this end, a guide finger plate 110 is mounted to the bracket 106 to push the center portions of the layers downwardly and clear of the rotating gears 100 and 102 for passage along a bottom guide plate 1 12 which supports the center portion of the layers. The guide figure plate extends to a point partially underlying the gear 102 sufficiently to prevent the center portions of the layers from being drawn into the nip of the gears. A top guide 114 may also be provided as shown.

As a result of the foregoing, all of the overlapped edge portions are stitched together independently (separately) of the center portions of the layers. This adds to the loft or reduced density of the finished cushioning or dunnage product. If desired, the center portions of the layers may be advanced by a second pair of rotating gears, as in a manner similar to that described in the application of Richard O. Ratzel, Ser. No. 08/478,555, filed even date herewith and entitled "Cushioning Conversion Machine for Converting Sheet-like Stock Material into a Cushioning Product". The entire disclosure of said application is hereby incorporated herein by reference.

The cutting assembly 38 is used to cut the thusly produced continuous strip at a desired length to form a cushioning product. In this manner, the length of the cushioning product may be varied depending on the intended application. The particular construction and operation of the strip-cutting assembly is not essential to the present invention. However, reference may be had to U.S. patent application No. 08/386, 355 for a cutting assembly similar to that illustrated, or to U.S. patent application No. 08/110,349 for another type of cutting assembly.

Figure 10:
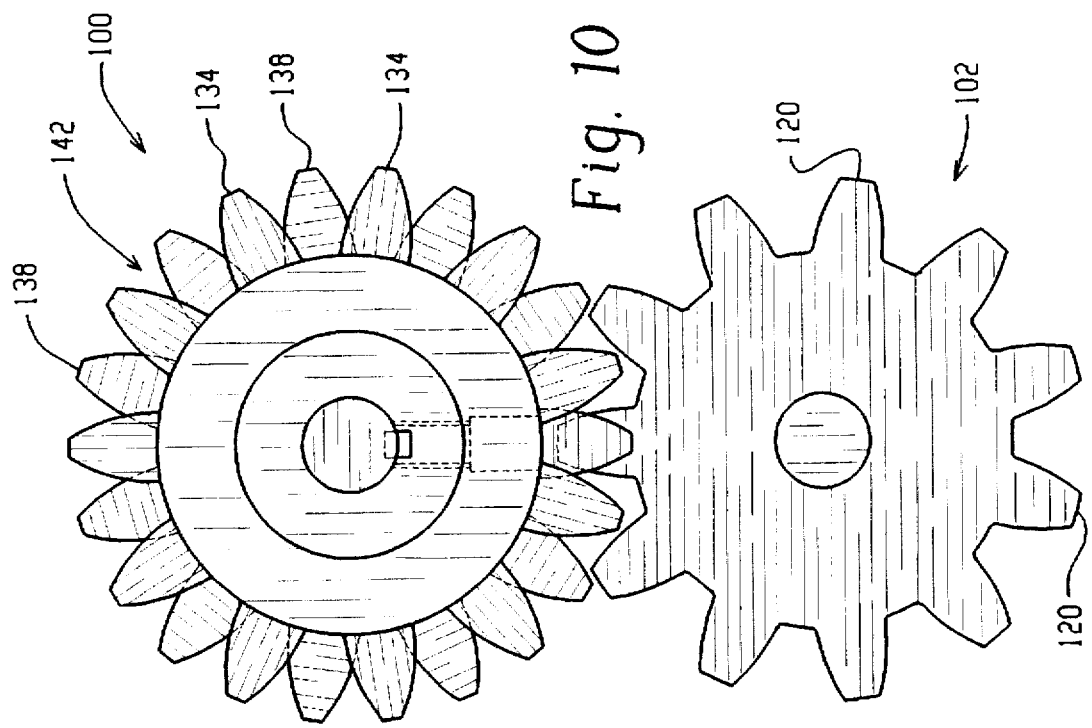
FIG. 10 is a side view of the stitching gears used in the machine of FIG. 1.
Figure 9:
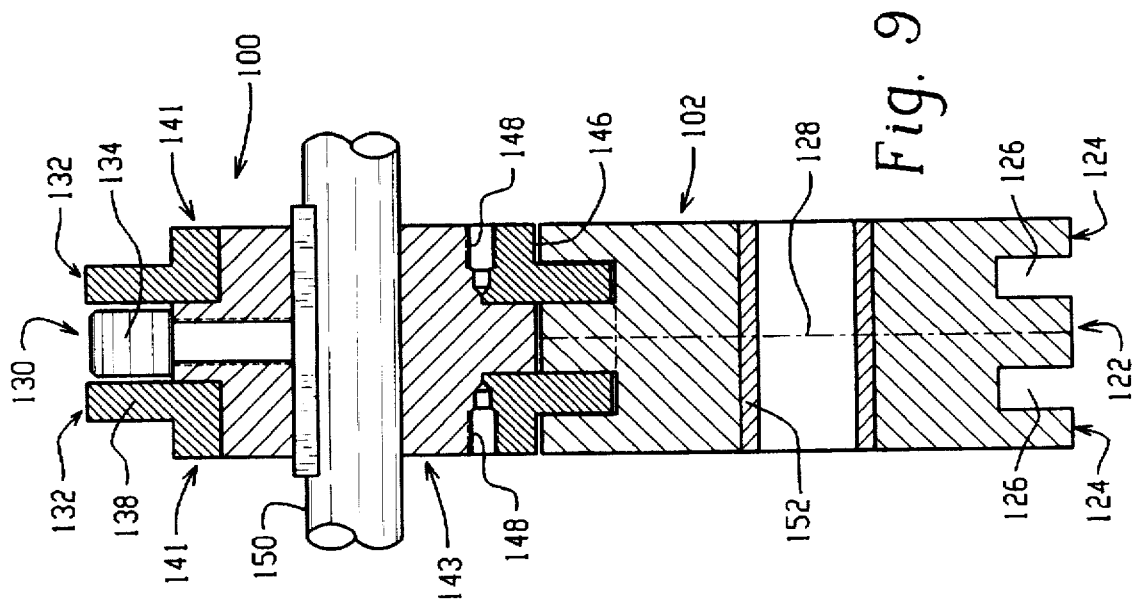
FIG. 9 is a sectional view through the stitching gears used in the machine of FIG. 1.

Referring now to FIGS. 9 and 10, details of the gears 100 and 102 can be seen. Although particularly useful in the above described machine, the gears may be used in place of the presently known gears (gear-like members in other conversion machines). It is noted that the new gear-like members may be used to perform both the stitching and feed functions previously performed by presently known gear-like members, or just the stitching function while other means are provided to perform the feed function, such as one or more feed assemblies for pushing and/or pulling the stock material through the machine and/or sub-components thereof.

The gear 102, herein also called the female stitching gear or wheel, has around the circumference thereof a plurality of radially outwardly extending projections 120 preferably in the form of teeth, such as the illustrated spur gear teeth. The teeth 120 are divided into a central segment 122 and outer or side segments 124 by annular recesses or grooves 126. The segments and grooves preferably are symmetrically disposed with respect to the center plane 128 of the female gear.

The other gear 100, herein also referred to as the male stitching gear or wheel, includes a central segment 130 and axially adjacent side segments 132 herein referred to as punch or perforating segments. The central segment 130 has around the circumference thereof a plurality of radially outwardly extending projections 134, preferably teeth such as the illustrated spur gear teeth, meshing with the teeth 120 of the central segment 122 of the female stitching gear 102. The punch segments 132 each have around the circumference thereof a plurality of radially outwardly extending projections 138 having a width slightly less than the width of the respective grooves 126 in the female gear and thus dimensioned to be received in the annular grooves during rotation of the stitching gears. The projections 138 on the punch segments 132 have the same pitch as the teeth 134 of the central segment 130, but are offset circumferentially by one half pitch, whereby they are aligned with the spaces or valleys 142 between the teeth 134 of the central segment 130 that receive the teeth 120 of the female gear during rotation of the gears. Consequently, during rotation of the gears, the projections 138 (or punches) will move past the synchronously moving teeth of the female stitching gear.

For easy fabrication of the male gear 100, the punch segments 132 may be formed on disc inserts 141 attached to a main gear body 143 including the central segment 130, as shown. The punch segments have axially extended hubs 146 fitted over axial hub projections at respective sides of the main gear body, with threaded holes 148 being provided for receiving set screws which lock the inserts against rotation relative to the main gear portion. As also shown, the male gear is keyed to the driven shaft 150 and the female gear may have a bushing 152 in a centerbore thereof for rotating on its shaft. The hubs 146 have an outer diameter equal the diameter of the base circle of the teeth 134.

The edges of the punch segment projections 138 (or at least the leading edges) preferably form with the sides thereof sharp corners which function as cutting or knife edges. Similarly, the edges (at least the leading edges) of the teeth 120 of the female gear 102 adjacent the annular grooves 126 form sharp corners with the side walls of the grooves, also to function as a cutting or knife edges in cooperative relationship with the cutting edges of the punch segment projections.

As should now be evident, the gears 100 and 102 will rotate synchronously because of the meshed central segments of the gears which are about equal in width. The meshing gears pull the overlapped lateral edge portions of the stock material therebetween and while doing so will form dents or indentations in the stock material and thus thereby coin the stock material. At the same time, the punch segment projections will move past the teeth of the female gear. At the nip of the gear, the then juxtaposed punch segment projection 138 and female gear tooth 120 will cause the portions of the stock material radially outwardly thereof to move in opposite directions while the cutting edges cooperate to create a shearing action forming a slit through each one of the overlapped layers at each side of a thus formed tab portion being punched by the punch segment projection. To prevent tearing of the stock material other than at the slits, the several projections may be rounded at their radially outer ends.

Figure 11:
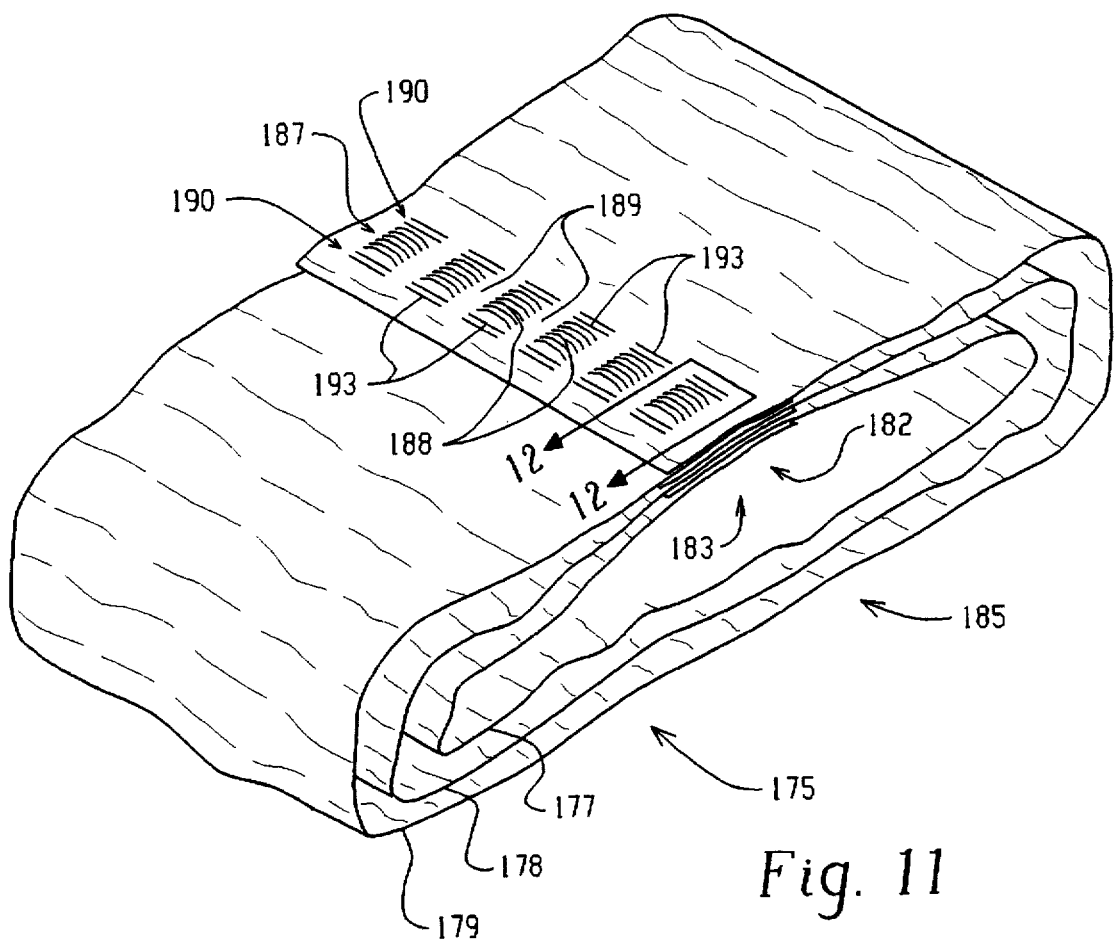
FIG. 11 is a schematic illustration of a cushioning product according to the invention.
Figure 12:
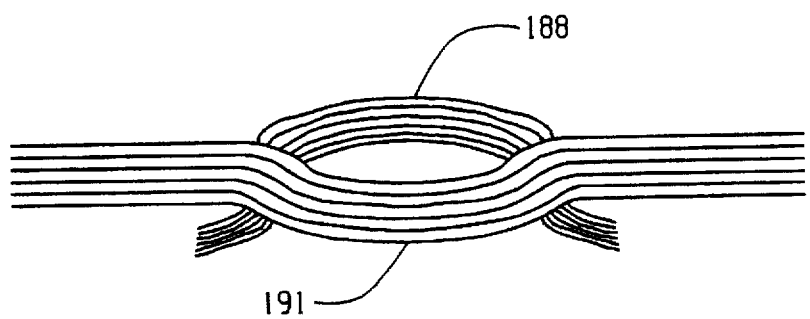
FIG. 12 is a cross-sectional view taken along the line 12—12 of FIG. 11.

Referring now to FIGS. 11 and 12, a cushioning product according to the invention is schematically illustrated at 175. The cushioning product comprises at least two and preferably three, or more, layers 177–179 of sheetlike material having lateral edge portions thereof folded over the center portions and interleaved as seen at 182. The overlapped and interleaved lateral edge portions 182 are stitched together along a central seam or band 183 separate from the central portions 185 of the layers which are crumpled and provide loft to the cushioning product. The overlapped lateral edge portions 182 are generally coplanar with adjacent unoverlapped portions of the first layer, and the layers of stock material comprise biodegradable, recyclable and reusable Kraft paper, as above mentioned.

As shown, the stitching pattern produced by the stitching gears includes a central row 187 of outwardly directed dents 188 alternating with a inwardly directed dents 189. The central row of dents is bounded at each side thereof by a row 190 of tabs 191. The tabs, which are defined by laterally spaced apart slits 193, are dented or punched from the layer of stock material in a direction opposite the relatively adjacent dent of the central row.

Although details of the method of forming the dunnage product according to the invention have been mentioned above in connection with the description of the structure of the machine, by way of summary a method according to the invention comprises the steps of shaping plural layers of the stock material into a tube with the lateral edge portions being brought into overlapping relationship and connecting the overlapped lateral edge portions of the outer layer separately from central portions of the layers. The overlapped lateral edge portions are generally coplanar with adjacent unoverlapped portions of the outer layer during the connecting step. Preferably, the layers of stock material comprise biodegradable, recyclable and reusable Kraft paper. Also, as is apparent from the foregoing description, the step of connecting the overlapped lateral edge portions includes using a pair of rotating connecting members forming therebetween a nip through which the overlapped lateral edge portions of the outer layer pass.

Although the invention has been shown and described with respect to certain preferred embodiments, it is obvious that equivalent alterations and modifications will occur to others skilled in the art upon the reading and understanding of this specification. For example, the stitching gears may be used in other types of machines and methods to stitch overlapped portions of one or more layers of stock material. The present invention includes all such equivalent alterations and modifications.

What is claimed is:

1. A cushioning conversion machine for converting stock material into a dunnage product, comprising:

a stock supplying assembly which supplies plural layers of stock material, each of said plural layers having two opposite longitudinal edge portions separated by a central portion;

a forming assembly which overlaps the opposite longitudinal edge portions of the plural layers of stock material to form overlapped edge portions and which shapes said plural layers of the stock material into a continuous three dimensional strip of dunnage having the overlapped edge portions on a first side opposite to a second side having the central portions of said layers of the formed three dimensional strip of dunnage ;

a feeding/connecting assembly which feeds the stock material through the forming assembly, the feeding/connecting assembly including a connecting assembly downstream of said forming assembly for connecting the overlapped edge portions of the layers separately from the central portions of said layers; and a guide which directs the central portions of the layers away from the connecting assembly to prevent the central portions from passing through said connecting assembly.

2. A conversion machine as set forth in claim 1, wherein said connecting assembly includes a pair of rotating connecting members forming therebetween a nip through which the overlapped edge portions pass.

3. A conversion machine as set forth in claim 2, further comprising a frame structure; and wherein said forming assembly includes a chute and a former extending into said chute, one of said rotating members is mounted to a downstream end of said former interiorly of the path of the stock material and the other is mounted to said frame structure independently of said former and externally of the path of the stock material, and a drive is provided for rotatably driving said other of said rotating members.

4. A conversion machine as set forth in claim 3, wherein said rotating connecting members have a plurality of teeth interacting with the teeth on the other to stitch together the overlapped edge portions, and said guide includes a finger projecting forwardly from said former to a point at least partially overlapping said rotating connecting members relative to the movement path of the stock material through the machine.

5. A conversion machine as set forth in claim 3, further comprising at least one separator member interposed between the respective paths of the plural layers of stock material upstream of said forming assembly.

6. A conversion machine as set forth in claim 3, wherein said one of said rotating members is mounted to a downstream end of a bracket connected to said former in a cantilevered manner.

7. A conversion machine as set forth in claim 6, wherein said bracket projects through and beyond a downstream end of said chute.

8. A method for converting stock material into a dunnage product, comprising the steps of:

supplying plural layers of stock material, each of said plural layers of stock material having opposite longitudinal edge portions separated by a central portion;

forming plural layers of the stock material into a tubular shape by continuously advancing and overlapping the opposite longitudinal edges to form overlapped edge portions on a side opposite to a side having the central portions of said layers of the formed tubular shape;

connecting the overlapped edge portions of the layers independently of the central portions of the layers.

9. A method as set forth in claim 8, wherein said forming step includes forming the overlapped edge portions in such a manner that they are generally coplanar with adjacent unoverlapped portions of the layers during said connecting step.

10. A method as set forth in claim 9, said supplying step comprises supplying plural layers of stock material that are biodegradable, recyclable and reusable Kraft paper.

11. A method as set forth in claim 9, wherein said step of connecting the overlapped edge portions includes using a pair of rotating connecting members forming therebetween a nip through which the overlapped edge portions of the layers pass.

12. A method as set forth in claim 11, wherein said rotating connecting members have a plurality of teeth interacting with the teeth on the other to stitch together the overlapped edge portions.

13. A method as set forth in claim 9, wherein said supplying step includes supplying the plural layers of stock material as multi-ply stock material and wherein the method further comprises the step of then separating the layers before said forming step.

14. A method as set forth in claim 13, wherein said forming step includes passing said plural layers through a converging chute.

* * * * *